Oct. 24, 1961 R. G. MINER 3,005,318
ABSORPTION REFRIGERATING SYSTEM
Filed Sept. 15, 1958

INVENTOR.
R. G. MINER
BY Holmes & Andersen
ATTORNEYS

United States Patent Office 3,005,318
Patented Oct. 24, 1961

3,005,318
ABSORPTION REFRIGERATING SYSTEM
Robert G. Miner, La Crosse, Wis., assignor to The Trane Company, La Crosse, Wis., a corporation of Wisconsin
Filed Sept. 15, 1958, Ser. No. 760,879
3 Claims. (Cl. 62—141)

This invention relates to absorption refrigerating systems and more particularly to controls for such systems.

It is an object of this invention to provide means for starting the various parts in sequence responsive to manually closing an electrical circuit to one of the pumps.

It is another object of the invention to provide means for discontinuing operation in such a manner that concentration of solution and solidification is avoided.

It is another object of the invention to delay de-energization of the pump which supplies lubrication until the pumps so supplied have been de-energized.

It is another object of the invention to conduct dilute solution from the absorber to the absorber solution recirculating conduits on shut down of the system to flush out the concentrated solution from these conduits in order to avoid solidification of concentrated solution in these conduits.

Figure 1:
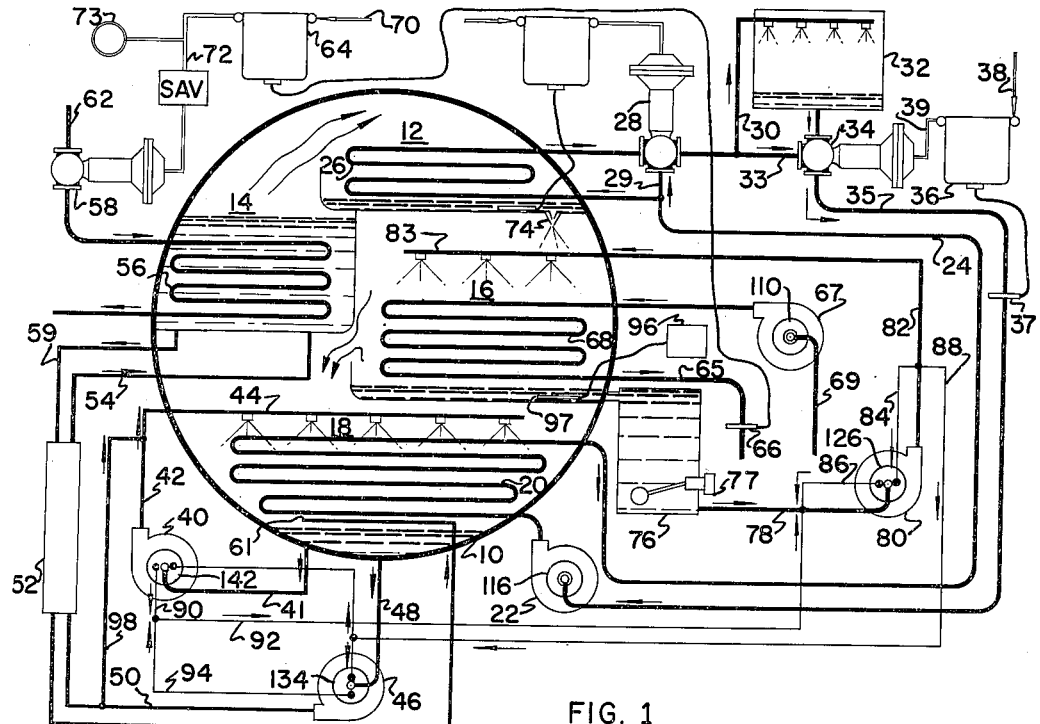
Figure 2:
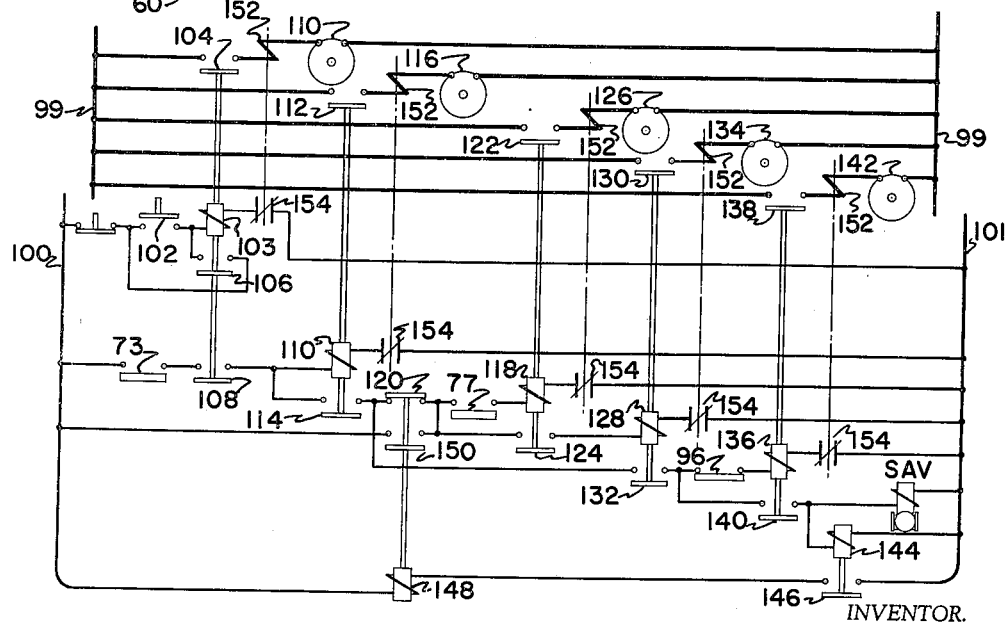

Other objects and advantages will become apparent as the specification proceeds to describe the invention with reference to the accompanying drawings in which:

FIG. 1 is a diagrammatic view of the absorption system including the controls; and FIG. 2 is a diagram showing the electrical circuit.

Referring now to FIG. 1, the absorption system shown has a single shell 10 enclosing a condenser 12, a generator 14, an evaporator 16 and an absorber 18. It should be understood that other arrangements might be used; for instance, the generator and condenser could be in one shell and the absorber and evaporator could be in a second shell with conduits therebetween for conducting fluids.

The absorber 18 has a coil 20 supplied with cooling fluid by a pump 22. This cooling fluid is conducted from the coil 20 through a conduit 24 to a cooling coil 26 in the condenser 12. From the cooling coil 26, the cooling fluid passes through a pneumatic valve 28 and thence through a conduit 30 to a cooling tower 32. A portion of the fluid flowing in pipe 24 may by-pass the coil 26 through the conduit 29 according to the position of the pneumatic valve 28 and a portion of the fluid flowing from the valve 28 may flow through conduit 33 through pneumatically operated valve 34 thus by-passing the cooling tower 32. A conduit 35 conducts fluid from the valve 34 to the pump 22. A pneumatic temperature controller 36 has a temperature sensitive bulb 37 in temperature sensing relationship with the fluid in conduit 35 and is connected to a source of air pressure 38. Temperature controller 36 transmits its control pressure to valve 34 through conduit 39. Refrigerant vapor from the generator 14 is condensed in condenser 12 by removal of heat through cooling coil 26.

Various types of refrigerant and absorbent may be used in the present machine. A solution of lithium bromide as an absorbent and water as a refrigerant is satisfactory. Other salt solutions may be used if desired.

The term "concentrated solution" as used herein means a solution which is concentrated in absorbent. A solution circulating pump 40 receives solution from the absorber 18 through conduit 41, and discharges the solution into a conduit 42 which is connected to a spray tree 44 which sprays the solution into the absorber 18 over the tubes 20.

A pump 46 draws solution from the absorber 18 through a conduit 48 and discharges the solution through a conduit 50 which conducts the fluid to a heat exchanger 52 from which the fluid flows through a conduit 54 to the generator 14.

The solution in the generator is heated by a coil 56 which is preferably supplied with steam as a heating fluid through valve 58. Boiling of the solution in the generator causes refrigerant vapors to pass into the condenser 12. The concentrated solution flows from the generator 14 through conduit 59 to heat exchanger 52 and thence through conduits 60 and 61 to the absorber 18. The outlet of conduit 61 is adjacent the entrance to conduit 41 and remote from the entrance to conduit 48 so that the solution flowing in conduit 41 is more concentrated than the solution flowing in conduit 48. The conduits 41 and 48 may be spaced longitudinally of the shell for the same reason if desired. In the heat exchanger 52, the dilute solution passing from the absorber 18 to the generator 14 is heated by the concentrated solution flowing from the generator 14 to the absorber 18. The steam valve 58 is connected to a source of steam 62. A pneumatic temperature controller 64 has a temperature sensitive bulb 66 in temperature sensing relationship with the fluid leaving the evaporator coil 68 through conduit 65. The fluid in circulation through the coil 68 may be water, brine, or other fluid, but for purposes of explanation it will be assumed to be water, and it will be called chilled water. A chilled water pump 67 is connected to receive chilled water from a refrigeration load through a conduit 69. After flowing through coil 68, the chilled water is returned to the refrigeration load through conduit 65. The temperature controller 64 is connected to a source of pneumatic pressure 70 and transmits control pressure to valve 58 through conduit 72. A solenoid air valve SAV is mounted in the conduit 72 between the temperature controller 64 and the valve 58. A pressure switch 73 is interposed in the conduit 72 between the pressure controller 64 and the solenoid valve SAV. The operation of the solenoid valve SAV and the pressure switch 73 will be more fully described later.

The refrigerant condensed in the condenser 12 flows downwardly through an opening 74 into the evaporator 16. The evaporator has a float chamber 76 containing a float switch 77 which opens when the level drops below a predetermined point. A conduit 78 conducts refrigerant from the float chamber 76 to a refrigerant pump 80. The refrigerant flows from the pump 80 through a conduit 82 to a spray tree 83 in the evaporator 16. Refrigerant vapor flows from the evaporator 16 to the absorber 18 thus causing evaporation and cooling of the refrigerant liquid in the evaporator 16.

Refrigerant from the conduit 82 is conducted through conduit 84 to the pump 80 to cool and lubricate the working parts thereof, and the refrigerant thus conducted to the pump is returned to conduit 78 through conduit 86.

Refrigerant from conduit 82 also flows through conduit 88 to pumps 40 and 46 to cool and lubricate the working parts thereof. From pump 40, the refrigerant flows through conduits 90, 92, and 78. From pump 46, the refrigerant flows through conduits 94, 92, and 78.

A low temperature cut-out switch 96 has a temperature sensitive bulb 97 in the refrigerant in the evaporator 16. Switch 96 initiates a shut down of the machine when the evaporator temperature drops below a predetermined point.

A conduit 98 conducts fluid from conduit 48 to conduit 42. As will be explained more fully in connection with the controls, the absorber recirculating pump 40 and the condenser water pump 22 are the first pumps to be de-energized when the machine is shut down. Inasmuch as the solution pump 46 continues to operate for a timed period, a portion of the solution delivered by it will flow through conduit 98. This solution will flow by gravity downward through pipe 42, then through pump 40 into conduit 41 and finally into the bottom of the absorber 18. The more concentrated solution in these conduits and in pump 40 is thus flushed out by the more dilute solution from pump 46 and the danger of solidification in these passageways when the system cools down is avoided. The solution in the spray tree 44 drains by gravity when the pump 40 is de-energized. When the machine is in normal operation, the pressure developed by pump 40 opposes flow through conduit 98 so that there is substantially no flow in this conduit 98.

The control system will now be described with reference to FIG. 2. Electric power is supplied for the motors of the pumps by power line 99. Electric power is supplied to other controls by power lines 100 and 101. To put the system into operation, the starting button switch 102 is closed thus energizing coil 103 which closes contacts 104, 106, and 108. Closing of contact 104 energizes the chilled water pump motor 110. Closing of holding contact 106 maintains energization of the line. Closing of contact 108 permits energization of coil 110 upon closing of pressure switch 73. Pressure switch 73 will be closed when the controller 64 indicates the need for cooling the chilled water. With contacts 73 and 108 closed, coil 110 is energized and contacts 112 and 114 are closed. Closing of contact 112 energizes the condenser water pump motor 116. Closing of contact 114 energizes coil 118 provided there is a level of water in sump 76 sufficient to close float switch 77. Contact 120 is normally closed. Energization of coil 118 closes contacts 122 and 124. Closing of contact 122 energizes motor 126 of refrigerant pump 80. Closing of contact 124 energizes coil 128 which closes contacts 130 and 132. Closing of contact 130 energizes motor 134 of solution pump 46. Closing of contact 132 energizes coil 136 provided that the temperature of the chilled water is not so low that low temperature cut-out switch 96 is open. Coil 136, being energized, closes contacts 138 and 140. Closing of contact 138 energizes the motor 142 of absorption recirculating pump 40. Closing of contact 140 energizes solenoid air valve SAV to permit pneumatic pressure to be transmitted from temperature controller 64 to valve 58 to open valve 58 and allow steam to enter the coil 56 of the generator 14.

Closing of contact 140 also energizes coil 144 to close contact 146. Coil 144 and contact 146 form a time delay relay which is instantaneous closing and time delayed opening.

Closing of contact 146 energizes coil 148 which closes contact 150 and opens contact 120. The contacts 120 and 150 are so constructed that they are overlapping in that contact 120 opens after contact 150 has been made. Closing of contacts 150 and opening of contact 120 transfers the source of power for the coil 118 of the refrigerant pump motor contact 122 and the coil 128 of the solution pump motor contactor 130 from the portion of the circuit supplied by the pressure switch 73 directly to one side of the source of control voltage.

As the load on the system is reduced, the steam valve will be gradually throttled to reduce the output of the machine, and upon further decrease in chilled water temperature, the pressure switch 73 will open to interrupt the circuit to the coils 110 to de-energize the condenser water pump and to interrupt the circuit to coil 136, the solenoid air valve SAV and the time delay coil 144. The absorber recirculating pump motor 142 is thus de-energized; the solenoid air valve SAV closes the steam valve 58 by closing off its air supply. Contact 146 will remain closed for approximately 10 minutes. During this period the contact 150 remains closed and energizes coils 118 and 128 to continue to energize the motor 126 of the refrigerant pump and the motor 134 of the solution pump.

During the time delay period a small amount of solution from conduit 48 flows through the conduit 98 to the conduit 42, thus diluting the more concentrated solution in conduit 42, pump 40, and conduit 41 as explained above. The continued operation of the pump 46 during the time delay period also transmits solution from the absorber 18 to the generator 14 and solution flows from the generator 14 to the absorber 18 thus reducing the concentration of absorbent in the solution in the generator 14, the conduit 59, the heat exchanger 52 and the conduit 60.

Should the temperature of the evaporator through abnormal operation become dangerously low, the low temperature cut-out 96 will open the circuit to the coil 136 which de-energizes the absorber recirculating pump motor 142 by opening the contact 138. At the same time, contact 140 will open to de-energize solenoid air valve and coil 144 of the time delay relay. As explained previously, the coil 140 will remain energized through the delaying action of coil 144 and contact 146. Therefore, the contact 150 will remain closed for the time delay period to continue operation of the refrigerant pump motor 126 and the solution pump motor 134 as explained above. When solenoid 148 becomes de-energized, contact 120 will close and contact 150 will open and inasmuch as these contacts are overlapping, coil 118 and coil 128 will continue to be energized and pump motors 126 and 134 will continue to be energized.

Loss of refrigerant in the evaporator for any reason will result in insufficient level in the float chamber 76 to maintain the float switch 77 closed. The opening of float switch 77 will de-energize pump motors 126, 134, and 142 and solenoid valve SAV thus interrupting the transmission of pneumatic pressure to valve 58 and causing valve 58 to close.

Each of the circuits to the motors 110, 116, 126, 134, and 142 has an overload coil 152 which will open a normally closed contact 154 in the circuit to the coil which controls the contacts for energizing the particular motor.

Although I have described a specific embodiment of my invention, it is contemplated that various changes may be made without departing from the spirit of my invention, and I desire to be limited only by the claims.

I claim:

1. In an absorption refrigeration system, the combination of a generator, a condenser, an evaporator and an absorber in a closed circuit, the circuit containing an absorbent and a refrigerant, conduit for conducting a concentrated solution of absorbent and refrigerant from the lower portion of said absorber to the upper portion of said absorber, first pump means in said conduit for moving said concentrated solution in said conduit, second pump means for conducting a dilute solution of absorbent and refrigerant from said absorber to said generator and means for conducting dilute solution from said second pump means to said conduit to dilute the solution in said conduit when the operation of said first pump means is terminated.

2. In an absorption refrigerating system, the combination of a generator, a condenser, an evaporator, and an absorber in a closed circuit, the circuit including an absorbent and a refrigerant, heating means in said generator, a valve for regulating the flow of heating fluid through said heating means, first pump means for circulating a solution of absorbent and refrigerant from the lower portion of said absorber to the upper portion of said absorber, second pump means for transferring a solution of absorbent and refrigerant from said absorber to said generator, third pump means for circulating refrigerant from the lower portion of said evaporator to the upper portion of said evaporator and means responsive to a predetermined minimum level of refrigerant in said evaporator for de-energizing, said first pump means, said second pump means and said third pump means and for closing said valve means to terminate flow therethrough.

3. In an absorption refrigerating system, the combination of a generator, a condenser, an evaporator and an absorber in a closed circuit, the circuit containing an absorbent and a refrigerant, heating means in said generator, a valve for regulating the flow of heating fluid through said heating means, first pump means for circulating a solution of absorbent and refrigerant from the lower portion of said absorber to the upper portion of said absorber, second pump means for transferring a solution of absorbent and refrigerant from said absorber to said generator, third pump means for circulating refrigerant from the lower portion of said evaporator to the upper portion of said evaporator, thermostatic means responsive to a minimum predetermined temperature of said evaporator for closing said valve and de-energizing said first pump means and time delay means responsive to said thermostatic means for de-energizing said second and said third pump means a predetermined time after de-energization of said first pump means whereby solutions of absorbent and refrigerant in the circuit are mixed to dilute the more concentrated solutions.

References Cited in the file of this patent

UNITED STATES PATENTS

| | | |
|---|---|---|
| 2,465,904 | McNeeley | Mar. 29, 1949 |
| 2,473,389 | Reid | June 14, 1949 |
| 2,502,104 | Reid | Mar. 28, 1950 |
| 2,550,428 | Reid | Apr. 24, 1951 |
| 2,582,837 | Leonard | Jan. 15, 1952 |
| 2,583,722 | Berestneff | Jan. 29, 1952 |
| 2,679,733 | Ashley | June 1, 1954 |
| 2,722,805 | Leonard | Nov. 8, 1955 |
| 2,722,806 | Leonard | Nov. 8, 1955 |
| 2,840,997 | Leonard | July 1, 1958 |
| 2,847,832 | Johnson | Aug. 19, 1958 |